US012673409B2

(12) United States Patent
Jellison et al.

(10) Patent No.: US 12,673,409 B2
(45) Date of Patent: Jul. 7, 2026

(54) INPUT DEVICE TO CONTROL TOOL MODE AND LIGHTING MODE OF A POWER TOOL

(71) Applicant: MILWAUKEE ELECTRIC TOOL CORPORATION, Brookfield, WI (US)

(72) Inventors: Jonathon Jellison, Milwaukee, WI (US); Alex D. Servais, Slinger, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days.

(21) Appl. No.: 18/746,272

(22) Filed: Jun. 18, 2024

(65) Prior Publication Data

US 2024/0424659 A1 Dec. 26, 2024

Related U.S. Application Data

(60) Provisional application No. 63/509,601, filed on Jun. 22, 2023.

(51) Int. Cl.
*B25F 5/02* (2006.01)
*F21V 33/00* (2006.01)

(52) U.S. Cl.
CPC ............ *B25F 5/02* (2013.01); *F21V 33/0084* (2013.01)

(58) Field of Classification Search
CPC ............................... B25F 5/02; F21V 33/0084
See application file for complete search history.

(56) References Cited

U.S. PATENT DOCUMENTS

| | | | | |
|---|---|---|---|---|
| 6,318,874 | B1 | 11/2001 | Matsunaga | |
| 8,981,680 | B2 | 3/2015 | Suda et al. | |
| 10,850,383 | B1 * | 12/2020 | Urban | B25F 5/00 |
| 2003/0194283 | A1 | 10/2003 | Kovarik et al. | |
| 2004/0156190 | A1 | 8/2004 | Tsuruta et al. | |
| 2005/0135084 | A1 * | 6/2005 | Chen | B25B 21/00 362/109 |
| 2006/0157260 | A1 | 7/2006 | Greese et al. | |

(Continued)

FOREIGN PATENT DOCUMENTS

| | | | |
|---|---|---|---|
| DE | 3831344 | A1 | 3/1990 |
| JP | 2002210678 | A | 7/2002 |

(Continued)

*Primary Examiner* — Lucas E. A. Palmer
(74) *Attorney, Agent, or Firm* — Michael Best & Friedrich LLP

(57) ABSTRACT

One example power tool includes an actuator configured to be actuated by a user to adjust a motor operating mode of a motor and a light operating mode of a work light. The power tool may also include an electronic processor configured to adjust the motor operating mode in response to determining that the actuator has been actuated in a first manner, and adjust the light operating mode in response to determining that the actuator has been actuated in a second manner that is different than the first manner. A different manner of actuation of the second actuator between the second manner and the first manner may include at least one of the group consisting of a different pressure applied to the second actuator, a different movement direction of the second actuator, a different amount of actuations of the second actuator within a predetermined time period, and combinations thereof.

12 Claims, 5 Drawing Sheets

(56) References Cited

U.S. PATENT DOCUMENTS

| | | | | |
|---|---|---|---|---|
| 2006/0220612 | A1* | 10/2006 | Feldmann | B25F 5/022 320/114 |
| 2007/0044983 | A1 | 3/2007 | Wuensch et al. | |
| 2008/0173139 | A1 | 7/2008 | Miyazaki et al. | |
| 2008/0257577 | A1 | 10/2008 | Tanaka et al. | |
| 2008/0264212 | A1 | 10/2008 | Leupert | |
| 2008/0266841 | A1 | 10/2008 | Gabriel et al. | |
| 2009/0309519 | A1* | 12/2009 | Suzuki | B25F 5/021 315/314 |
| 2013/0063051 | A1* | 3/2013 | Sterling | B25F 5/021 315/360 |
| 2013/0076271 | A1* | 3/2013 | Suda | B25F 5/00 318/3 |
| 2017/0151657 | A1* | 6/2017 | Nagasaka | H01H 13/08 |
| 2017/0190041 | A1* | 7/2017 | Dey, IV | B25F 5/006 |
| 2018/0222022 | A1* | 8/2018 | Kumagai | B25D 11/104 |
| 2018/0248507 | A1* | 8/2018 | Vanko | H02P 29/50 |
| 2019/0381648 | A1* | 12/2019 | Wadeson | B25B 21/002 |
| 2020/0094392 | A1* | 3/2020 | Larsen | B25F 5/02 |
| 2020/0147771 | A1* | 5/2020 | Mergener | B25F 5/00 |
| 2020/0376645 | A1* | 12/2020 | Davis | H04M 1/72412 |
| 2021/0016428 | A1* | 1/2021 | Nakashima | B25F 5/02 |
| 2021/0060755 | A1* | 3/2021 | Kawai | B25F 5/00 |
| 2021/0122017 | A1* | 4/2021 | Kelly | H05B 47/16 |
| 2021/0234225 | A1* | 7/2021 | Takeda | B25D 17/00 |
| 2021/0240145 | A1* | 8/2021 | Abbott | B23B 51/009 |
| 2022/0221834 | A1* | 7/2022 | Dobashi | G05B 19/4183 |
| 2022/0305603 | A1* | 9/2022 | Rajzer | B25F 5/00 |
| 2023/0234206 | A1* | 7/2023 | Yamanaka | B25B 23/147 173/46 |

FOREIGN PATENT DOCUMENTS

| | | | |
|---|---|---|---|
| JP | 2007223037 | A | 9/2007 |
| JP | 2008023635 | A | 2/2008 |
| JP | 2010247299 | A | 11/2010 |

* cited by examiner

INPUT DEVICE TO CONTROL TOOL MODE AND LIGHTING MODE OF A POWER TOOL

RELATED APPLICATIONS

This application claims priority to U.S. Provisional Application No. 63/509,601, filed on Jun. 22, 2023, the entire contents of which are hereby incorporated by reference.

FIELD OF THE INVENTION

Some disclosed embodiments relate to a handheld power tool that includes a work light. Specifically, some disclosed embodiments relate to a handheld power tool that includes a user input device to control a motor operating mode of a motor of the power tool and a light operating mode of the work light.

SUMMARY

Handheld power tools may include one or more work lights configured to illuminate a working area of the power tool. For example, a power tool may include a single work light positioned near an output device of the power tool to illuminate an area on which the output device is providing an output to, for example, drill into a work piece, secure a fastener in a work piece, sand an area of a work piece, or the like.

Some power tools may include a work light located on a front surface of the power tool and configured to illuminate a working area of the power tool. For example, a high-torque impact wrench may include a single light-emitting diode (LED) positioned near an output device that is configured to transfer rotational energy from the high-torque impact wrench to a fastener. While the high-torque impact wrench is being operated by a user, the LED may illuminate the fastener so that the user can more easily see the fastener. For enhanced lighting, some power tools may include multiple LEDs positioned radially around the output device or end tool of the power tool. Similarly, in some instances, a power tool may include multiple LEDs positioned on an outer circumference of a portion of a power tool housing. Providing multiple LEDs around the output device or on an outer circumference of a portion of the power tool housing creates more even lighting applied to more or all sides of the output device or end tool, which reduces or prevents shadows from being cast. This type of lighting may be generally referred to as shadowless lighting.

Power tools may have different tool modes (e.g., motor operating modes) and different light operating modes that are adjustable by a user depending on situation in which the power tool is being used. However, it is desirable to keep power tools (e.g., handheld power tools) light weight, compact, and easily maneuverable. Accordingly, there may be limited space on a power tool for user input devices such as actuators (e.g., buttons, switches, etc.). Due to the limited space on a power tool, using a single user input device to optionally control both a tool mode of the power tool and a light operating mode of a work light of the power tool may be advantageous. Additionally, when power tool includes a light operating mode user input device that is separate from a tool mode user input device, it may be advantageous for both of the separate user input devices to provide a signal to an electronic processor of the power tool using the same input pin of the electronic processor, for example, via a user interface control circuit/printed circuit board.

One embodiment provides a power tool that may include a housing, and a motor situated within the housing. The power tool may also include an output device coupled to the motor and configured to perform a task. The power tool may also include a first actuator situated on the housing and configured to be actuated by a user to enable operation of the motor to drive the output device to perform the task. The power tool may also include a work light situated within the housing and configured to illuminate a work area where the task is being performed. The power tool may also include a second actuator situated on the housing and configured to be actuated by the user to adjust a motor operating mode of the motor and a light operating mode of the work light. The power tool may also include an electronic processor situated within the housing and coupled to the first actuator and the second actuator. The electronic processor may be configured to control the motor according to the motor operating mode in response to determining that the first actuator has been actuated. The electronic processor also may be configured to control the work light according to the light operating mode. The electronic processor also may be configured to adjust the motor operating mode in response to determining that the second actuator has been actuated in a first manner. The electronic processor also may be configured to adjust the light operating mode in response to determining that the second actuator has been actuated in a second manner that is different than the first manner. A different manner of actuation of the second actuator between the second manner and the first manner may include at least one of the group consisting of a different pressure applied to the second actuator, a different movement direction of the second actuator, a different amount of actuations of the second actuator within a predetermined time period, and combinations thereof.

In addition to any combination of features described above, the motor operating mode may be one of a plurality of motor operating modes that indicate at least one of the group consisting of a speed of the motor, a torque of the motor, a manner of operation of the output device, and combinations thereof.

In addition to any combination of features described above, the manner of operation of the output device may include at least one of the group consisting of a hammer only operation, a hammer and rotate operation, a rotate only operation, a specific operation upon detection of a certain operational event, and combinations thereof.

In addition to any combination of features described above, the light operating mode may be one of a plurality of light operating modes that include at least two of an always off light mode, an always on light mode, a first actuator enabled bright light mode, a first actuator enabled dim light mode, and combinations thereof.

In addition to any combination of features described above, the second actuator may include a pressure dependent switch configured to provide a signal to the electronic processor based on an amount of pressure applied to the second actuator when the second actuator is actuated.

In addition to any combination of features described above, the second actuator may be configured to be actuated in a plurality of directions. The first manner of actuating the second actuator may include moving the second actuator in a first direction. The second manner of actuating the second actuator may include moving the second actuator in a second direction different than the first direction.

In addition to any combination of features described above, the housing may include a motor housing, a connection portion, and a handle extending between and coupling the motor housing and the connection portion. The second actuator may be located on one of a top surface of the motor housing, a top surface of the connection portion, a rear side of the motor housing, a rear side of the connection portion, and a lower side of the motor housing between the motor housing and the handle.

In addition to any combination of features described above, the power tool may include one of an impact wrench, a sander, a power drill, a hammer drill, a rotary hammer, an impact driver, and a nailer.

Another embodiment provides a method of controlling a power tool. The method may include controlling, with an electronic processor of the power tool, a motor of the power tool according to a motor operating mode in response to determining that a first actuator of the power tool has been actuated. The method may also include controlling, with the electronic processor, a work light of the power tool according to a light operating mode. The work light may be configured to illuminate a work area of the power tool. The method may also include adjusting, with the electronic processor, the motor operating mode in response to determining that a second actuator of the power tool has been actuated in a first manner. The method may also include adjusting, with the electronic processor, the light operating mode in response to determining that the second actuator has been actuated in a second manner that is different than the first manner. A different manner of actuation of the second actuator between the second manner and the first manner may include at least one of the group consisting of a different pressure applied to the second actuator, a different movement direction of the second actuator, a different amount of actuations of the second actuator within a predetermined time period, and combinations thereof.

In addition to any combination of features described above, the motor operating mode may be one of a plurality of motor operating modes that indicate at least one of the group consisting of a speed of the motor, a torque of the motor, a manner of operation of an output device coupled to the motor and configured to perform a task, and combinations thereof.

In addition to any combination of features described above, the manner of operation of the output device may include at least one of the group consisting of a hammer only operation, a hammer and rotate operation, a rotate only operation, a specific operation upon detection of a certain operational event, and combinations thereof.

In addition to any combination of features described above, the light operating mode may be one of a plurality of light operating modes that include at least two of an always off light mode, an always on light mode, a first actuator enabled bright light mode, a first actuator enabled dim light mode, and combinations thereof.

In addition to any combination of features described above, the second actuator may include a pressure dependent switch configured to provide a signal to the electronic processor based on an amount of pressure applied to the second actuator when the second actuator is actuated.

In addition to any combination of features described above, the second actuator may be configured to be actuated in a plurality of directions. The first manner of actuating the second actuator may include moving the second actuator in a first direction. The second manner of actuating the second actuator may include moving the second actuator in a second direction different than the first direction.

In addition to any combination of features described above, the power tool may include a housing that may include a motor housing, a connection portion, and a handle extending between and coupling the motor housing and the connection portion. The second actuator may be located on one of a top surface of the motor housing, a top surface of the connection portion, a rear side of the motor housing, a rear side of the connection portion, and a lower side of the motor housing between the motor housing and the handle.

In addition to any combination of features described above, the power tool may include one of an impact wrench, a sander, a power drill, a hammer drill, a rotary hammer, an impact driver, and a nailer.

Another embodiment provides a power tool that may include a housing, and a motor situated within the housing. The power tool may also include an output device coupled to the motor and configured to perform a task. The power tool may also include a first actuator situated on the housing and configured to be actuated by a user to enable operation of the motor to drive the output device to perform the task. The power tool may also include a second actuator situated on the housing and configured to be actuated by the user to adjust a motor operating mode of the motor. The power tool may also include a work light situated within the housing and configured to illuminate a work area where the task is being performed. The power tool may also include a third actuator situated on the housing and configured to be actuated by the user to adjust a light operating mode of the work light. The power tool may also include a user interface control circuit situated within the housing and coupled to the second actuator and the third actuator. The power tool may also include an electronic processor situated within the housing and coupled to the user interface control circuit. The electronic processor may be configured to receive a signal from the user interface control circuit, and determine whether the signal indicates that the second actuator has been actuated or that the third actuator has been actuated. The electronic processor may also be configured to adjust the motor operating mode in response to determining that the signal indicates that the second actuator has been actuated. The electronic processor may also be configured to adjust the light operating mode in response to determining that the signal indicates that the third actuator has been actuated. The electronic processor may also be configured to control the motor according to the motor operating mode in response to determining that the first actuator has been actuated. The electronic processor may also be configured to control the work light according to the light operating mode.

In addition to any combination of features described above, the signal may be received by the electronic processor via a single input pin of the electronic processor. The electronic processor may be configured to determine whether the signal indicates that the second actuator has been actuated or that the third actuator has been actuated by analyzing a voltage level of the signal.

In addition to any combination of features described above, the electronic processor may be configured to determine that the second actuator has been actuated in response to the voltage level being within a first voltage range, and may be configured to determine that the third actuator has been actuated in response to the voltage level being within a second voltage range different than the first voltage range.

In addition to any combination of features described above, the user interface control circuit may be located on a first circuit board, and the electronic processor may be located on a second circuit board. The first circuit board may be located closer to the third actuator than the second circuit board is located to the third actuator.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
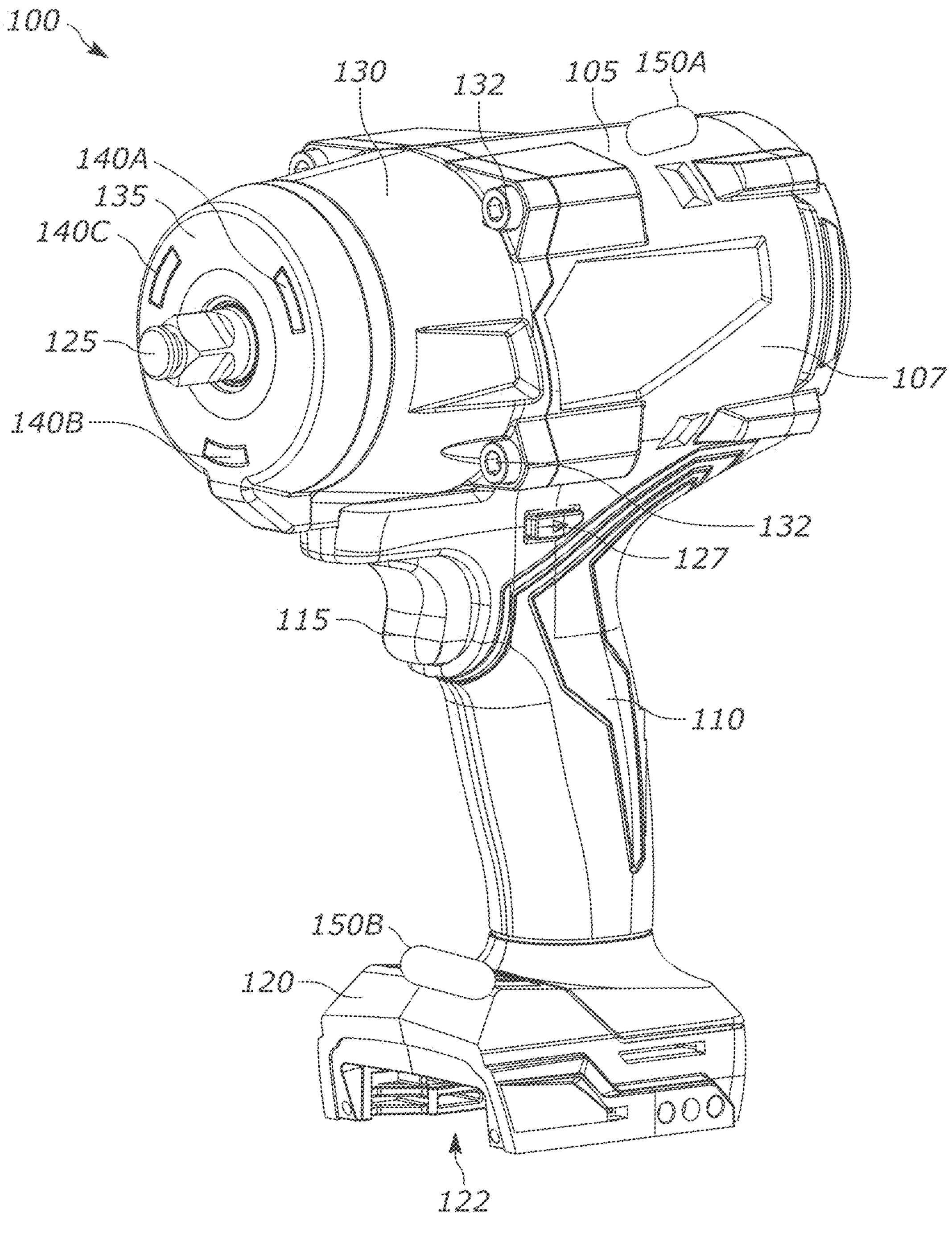
FIG. 1 illustrates a power tool that includes a work light, according to some embodiments described herein.

FIG. 1 illustrates a power tool 100 that includes a shadowless lighting system according to one example embodiment. The power tool 100 includes a primary housing 105. The primary housing 105 may be a main body of the power tool 100. The primary housing 105 may be configured to house a motor 200 (see FIG. 2) such as a brushless direct current (BLDC) motor in an upper portion 107 of the primary housing 105. Accordingly, the primary housing 105 (in particular, the upper portion 107 of the primary housing 105) may also be referred to as a motor housing 107. In some embodiments, the primary housing 105 is formed from two pieces of plastic configured to mate (e.g., a clamshell housing), such that an interior cavity is formed within the primary housing 105. A portion of the primary housing 105 may be formed into a handle 110 to allow a user to hold the power tool 100. A trigger 115 (i.e., an actuator 115) may be positioned on the handle 110 to allow a user to actuate the trigger 115 to variably control at least one parameter of the power tool 100. In some embodiments, the parameter may be an amount of power supplied to a motor of the power tool 100. The primary housing 105 may further include a connection portion 120 (i.e., a foot portion of the power tool 100) that may include an interface 122 (i.e., a battery pack interface 122) configured to removably couple to a battery pack (not shown). The interface 122 may include electrical contacts to allow power to be transferred from the battery pack to the power tool 100 (e.g., to provide power to the motor and other components of the power tool 100).

Figure 4:
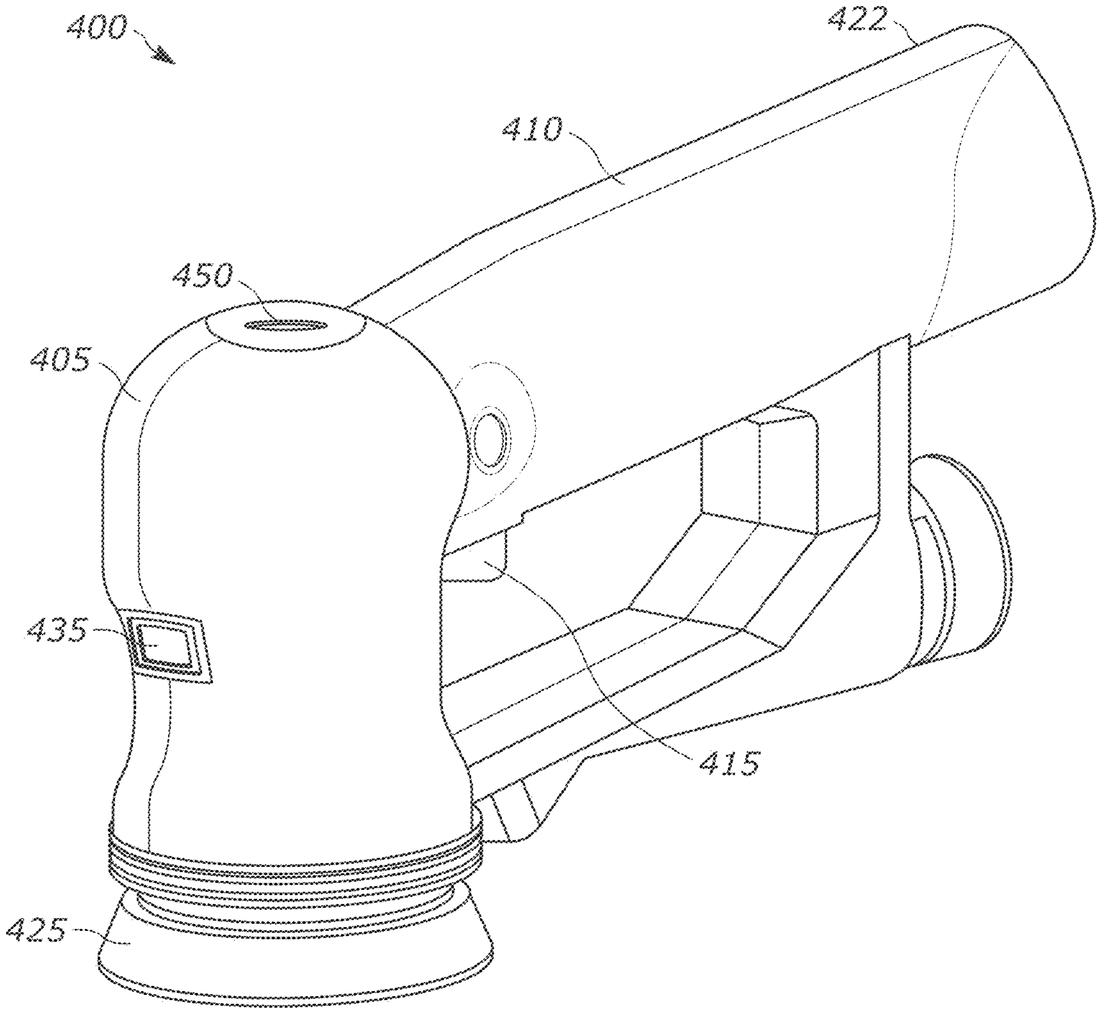
FIG. 4 illustrates another power tool that includes a work light, according to some embodiments described herein.

The power tool 100 further includes an output device 125 on one end of the upper portion 107 of the primary housing 105 to provide an output of the power tool. For example, the output of the power tool may be a rotational output, an impacting output, a reciprocating output, etc. In some embodiments, the output device 125 may include a fitting (e.g., a chuck, a collet, or the like) to removably couple an end tool (e.g., a tool bit) to the output device 125. In other embodiments, the output device 125 may be formed such that a fastener directly removably couples to the output device 125 to perform a loosening or tightening operation of the fastener. In some embodiments, the power tool 100 includes a forward/reverse switch 127 configured to allow a user to select a rotational direction of the output device 125. The output device 125 may be configured to perform one or more specific tasks (e.g., drilling, cutting, fastening, pressing, lubricant application, sanding, heating, grinding, bending, forming, impacting, polishing, lighting, etc.). For example, an impact wrench is associated with the task of generating a rotational output (e.g., to drive a bit), while a reciprocating saw is associated with the task of generating a reciprocating output motion (e.g., for pushing and pulling a saw blade). As another example, a sander is associated with the task of moving a sanding element (e.g., sand paper, a sanding attachment, or the like) rotationally, reciprocally, orbitally, and/or the like to sand a work piece. The task(s) associated with a particular power tool and output device 125 may also be referred to as the primary function(s) of the power tool and output device 125. The particular power tools 100, 400 illustrated and described herein (e.g., an impact wrench 100 as shown in FIG. 1 and a sander 400 as shown in FIG. 4) are merely representative. Other embodiments of the disclosure include a variety of types of power tools (e.g., a power drill, a hammer drill, a rotary hammer, an impact driver, a pipe cutter, a nailer, a grease gun, etc.).

Figure 2:
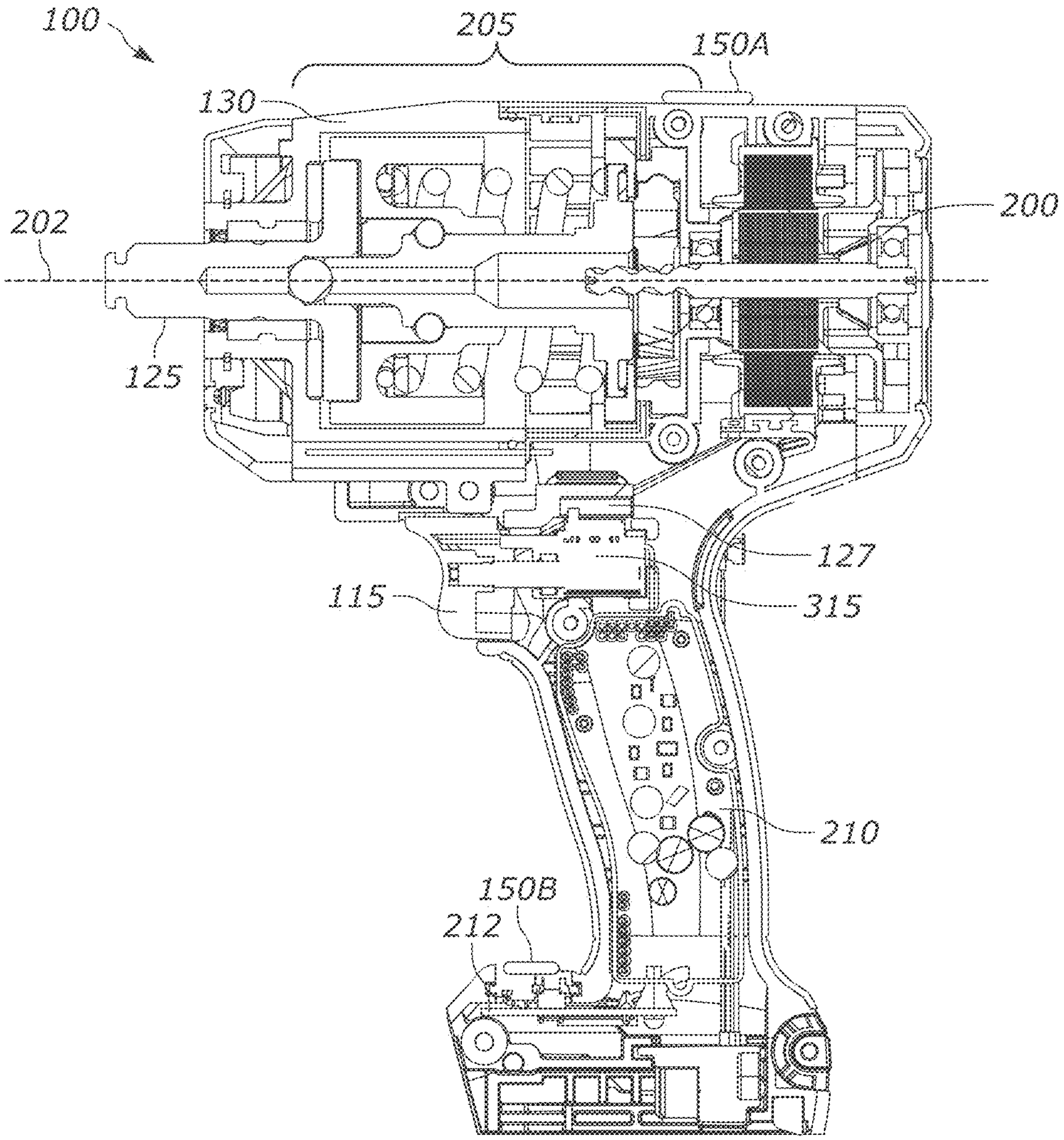
FIG. 2 illustrates a cross-sectional view of the power tool of FIG. 1, according to some embodiments described herein.

The power tool 100 further includes a secondary housing 130 separate from the primary housing 105. The secondary housing 130 may be configured to house a transmission mechanism of the power tool 100 configured to transmit rotational energy from the motor 200 of the power tool 100 to the output device 125. In some embodiments, the secondary housing 130 is a gear case, a hammer case, or the like. The secondary housing 130 may be made of metal. The secondary housing 130 may be positioned such that an end surface of the secondary housing 130 contacts at least a portion of an end surface of the primary housing 105. For example, as shown in FIG. 1, a rear end of the secondary housing 130 may be fastened to a front end of the upper portion 107 of the primary housing 105 using fasteners 132. The output device 125 may be coupled to the motor 200 indirectly (e.g., through an intermediary transmission mechanism 205 as shown in FIG. 2) or directly without an intermediary transmission mechanism (e.g., a direct drive tool such as sander 400 of FIG. 4).

The power tool 100 further includes a retaining portion 135 configured to retain one or more light sources of the power tool 100. In some embodiments, the retaining portion 135 is configured to surround the output device 125. The retaining portion 135 may include one or more lenses 140 to allow for one or more light sources to emit light through the retaining portion 135. In some embodiments, the one or more light sources may be light-emitting diodes (LEDs) arranged about a center point of the retaining portion 135 (i.e., arranged about an output axis 202 of the output device 125). While referred to as the retaining portion 135, the retaining portion 135 may also be referred to as a work light 135 or a lighting assembly 135.

In some instances, the power tool 100 may include a user input device 150 (e.g., an actuator 150) configured to be actuated by a user to change a tool mode (e.g., a motor operating mode of the motor 200), a light operating mode of the work light 135, or both the tool mode and the light operating mode depending on how the actuator 150 is actuated as explained in greater detail herein. In instances in which the actuator 150 is configured to allow the user to change both the tool mode and the light operating mode depending on different actuation manners of the actuator 150, the actuator 150 may be referred to as a multi-function actuator 150. FIG. 1 illustrates different possible locations of the actuator 150. In some instances, the actuator 150A is located/situated on a top surface of the motor housing 107 (e.g., on a top surface of the upper portion 107 of the primary housing 105). In some instances, the actuator 150B is located on a top surface of the connection portion 120 (i.e., on a top surface of the foot portion of the power tool 100 that includes the battery pack interface 122. In some instances, the actuator 150 may be located in a different location on the power tool 100 (e.g., near the forward/reverse switch 127 (on a lower side of the motor housing 107 between the motor housing 107 and the handle 110), on a rear or side of the upper portion 107 of the primary housing 105, on a rear or side of the connection portion 120, etc.).

The particular power tool 100 illustrated and described in FIG. 1 (e.g., an impact wrench) is merely an example. The lighting assembly 135 and/or other features described herein may also be implemented on other types of power tools (e.g., the sander 400 of FIG. 4, other power tools such as those types of power tools mentioned previously herein, etc.). For example, FIG. 4 illustrates another example of a power tool as a sander 400. The sander 400 includes many similar elements as the impact wrench 100 with similar elements labeled with the same reference numerals as FIG. 1 but increased by 300. Unless otherwise noted, the explanation herein of elements with respect to the impact wrench 100 also applies to similar elements of the sander 400. The sander 400 includes a primary housing 405 that may include a handle 410. The sander 400 may further include a trigger 415, a battery pack interface 422, an output device 425, a work light 435, and an actuator 450. The output device 425 may be configured to allow a sanding pad or sand paper to be attached to the output device 425. As explained previously herein, the output device 425 may be coupled to the motor 200 directly (e.g., coupled to a motor shaft) without an intermediary transmission mechanism such that the sander 400 is a direct drive tool. While the work light 435 is shown as a single LED work light on a front of the sander 400, in some instances, the work light 135 may include additional LEDs that extend along an outer circumference of the housing 405 toward the sides of the sander 400 from the work light 435 shown in FIG. 4. For example, an arc-shaped work light (including an arc-shaped lens and multiple LEDs) that surrounds approximately 180 degrees, approximately 120 degrees, approximately 90 degrees, or the like of the front of the circumference of the housing 405 may be included on the sander 400 to provide increased illumination of a work area. In some instances, the actuator 450 is a multi-function actuator 450 similar to the actuator 150 explained herein. In some instances, the actuator 450 includes a membrane switch. In some instances, the actuator 450 may be located/situated at other locations on the housing 405 of the sander 400 (e.g., near the work light 435 on a front surface of the housing 405, on a side of the housing 405, and/or the like). The explanations herein of control elements and functionality of the impact wrench 100 and circuitry/wiring/circuit boards of the impact wrench 100 similarly apply to the sander 400 and its corresponding elements. Such explanations may also apply to other types of power tools including, but not limited to, the example other types of power tools provided herein.

FIG. 2 illustrates a cross-sectional view of the power tool 100 according to one example embodiment. The power tool 100 includes a motor 200 configured to provide a rotational output about an axis 202 (i.e., a motor axis or output axis). The power tool 100 further includes a transmission mechanism 205 (i.e., transmission device 205) configured to transfer the rotational output of the motor 200 to the output device 125. The transmission mechanism 205 may be a gear transmission mechanism, an electronic transmission mechanism, an impacting transmission mechanism, a combination of multiple types of transmission mechanism, or the like. At least a portion of the transmission mechanism 205 may be positioned within the secondary housing 130. As explained previously herein, other types of power tools (e.g., the sander 400 of FIG. 4) may not include the transmission mechanism 205 as the motor 200 may be directly coupled to the motor 200.

In some embodiments, the transmission mechanism 205 of the power tool 100 includes an impact mechanism that includes hammer with outwardly extending lugs and an anvil with outwardly extending lugs. The anvil may be coupled to the output device 125. During operation, impacting occurs when the anvil encounters a certain amount of resistance, e.g., when driving a fastener into a workpiece. When this resistance is met, the hammer may continue to rotate. A spring coupled to the back-side of the hammer causes the hammer to disengage the anvil by axially retreating. Once disengaged, the hammer will advance both axially and rotationally to again engage (i.e., impact) the anvil. When the impact mechanism is operated, the hammer lugs impact the anvil lugs every 180 degrees, for example. Accordingly, when the power tool 100 is impacting during operation, the hammer rotates 180 degrees without the anvil, impacts the anvil, and then rotates with the anvil a certain amount before repeating this process.

The power tool 100 may further include a printed circuit board (PCB) 210 located/situated in the handle 110 and a PCB 212 located in the connection portion 120. One or both of the PCBs 210 and 212 include one or more electronic components that may implement a control system of the power tool 100. In some embodiments, the PCB 212 includes an electronic processor 350 (see FIG. 3) configured to receive power from a power supply connected to the power tool 100 (e.g., a battery pack connected to the power tool 100 via the interface 122). The electronic processor 350 may be configured to control whether power is provided to the work light 135 and/or the motor 200. The PCB 210 may include switching elements 345 (e.g., field-effect transistors 345) that are controlled by the electronic processor 350 to selectively provide power to coils of the motor 200 to allow operation thereof. In other embodiments, the PCBs 210 and 212 may include additional or alternative components. For example, the components located on each PCB 210 and 212 as described above may be located on the other PCB 210 and 212.

Figure 5A:
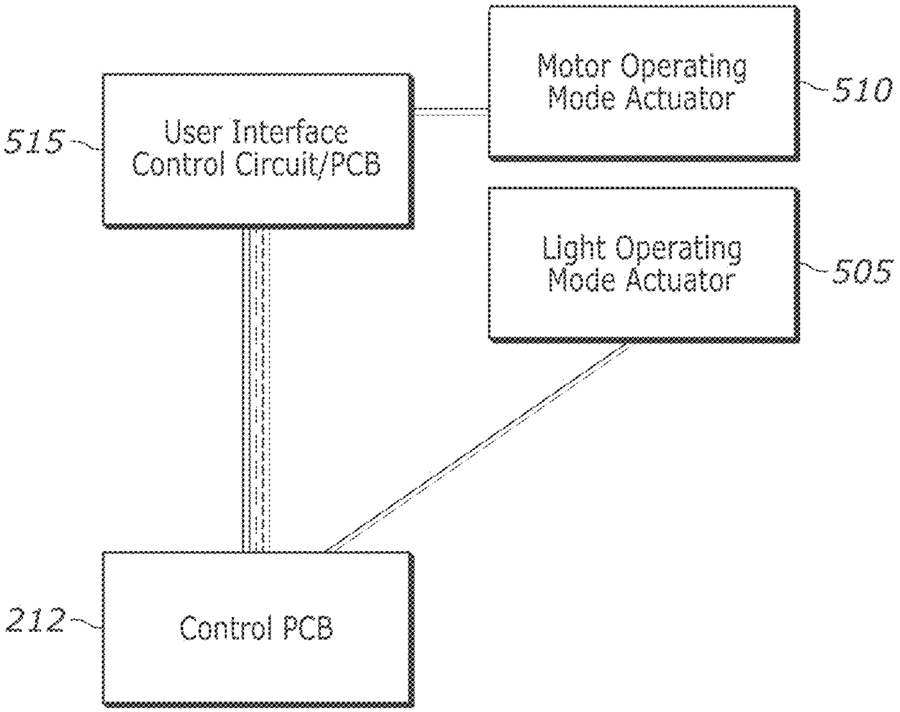
FIGS. 5A and 5B illustrate schematic diagrams of a power tool that includes a separate light operating mode actuator and motor operating mode actuator, according to some embodiments described herein.
Figure 5B:
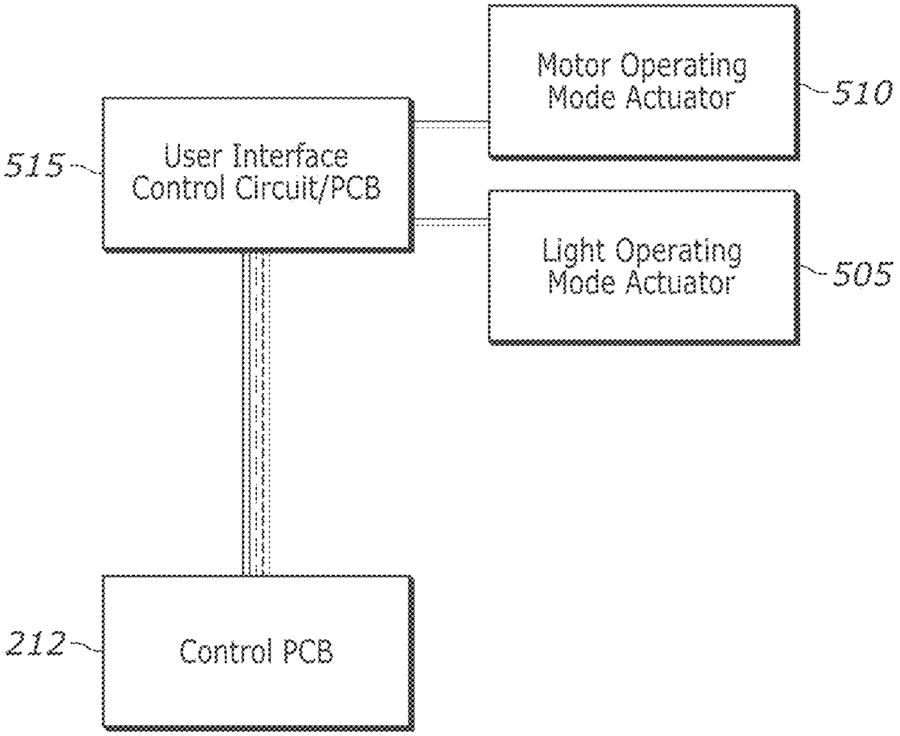

In some instances, the power tool 100 includes a user interface control circuit located on the PCB 210 or located on a separate user interface control PCB within the power tool 100 (e.g., above the trigger 115, adjacent to and approximately parallel to the PCB 210, or the like). The user interface control circuit may be coupled to the trigger 115 and/or the actuator 150 to determine when each of the trigger 115 and the actuator 150 is actuated. In some instances, instead of including the multi-functional actuator 150, the power tool 100 may include a light operating mode user input device (e.g., a second actuator) that is separate from a tool mode user input device (e.g., a third actuator) as shown in FIGS. 5A-5B. In some instances, the user interface control circuit may be coupled to each of the light operating mode actuator and the tool mode actuator as explained in greater detail herein with respect to FIGS. 5A-5B. In some instances, the user interface control circuit is also coupled to the PCB 212 (e.g., the user interface control circuit is coupled to the electronic processor 350 located/situated on the PCB 212) as explained in greater detail herein with respect to FIGS. 5A-5B. In such embodiments, the user interface control circuit may provide one or more signals to the electronic processor 350 that are indicative of (i) whether a user input device (e.g., trigger 115, multi-function actuator 150, light operating mode actuator, tool mode actuator, and/or the like) has been actuated and/or (ii) a manner in which each user input device has been actuated as explained in greater detail herein.

Figure 3:
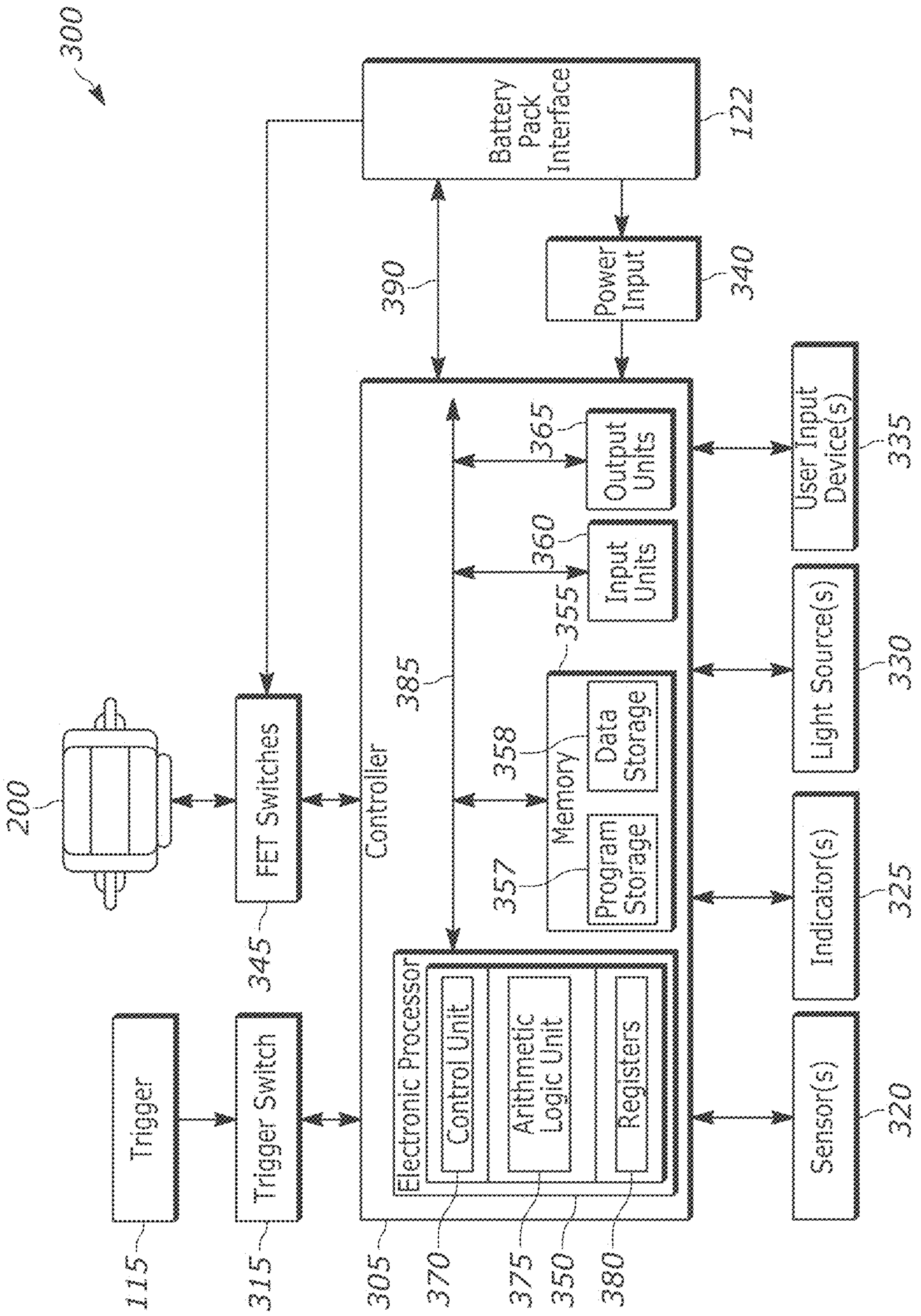
FIG. 3 illustrates a block diagram of the power tool of FIG. 1, according to some embodiments described herein.

FIG. 3 illustrates a block diagram 300 of the power tool 100, 400 according to one example embodiment. The power tool 100, 400 may include a controller 305. The controller 305 is electrically and/or communicatively connected to a variety of components of the power tool 100, 400. For example, as illustrated by FIG. 3, the controller 305 is electrically connected to the motor 200, a battery pack interface 122, a trigger switch 315 (connected to the trigger 115), one or more sensors or sensing circuits 320, one or more indicators 325, one or more light sources 330 (e.g., LEDs that form the work light 135), a user input device(s) 335 (e.g., actuator 150, other switches or buttons, a mode pad, etc.), power input circuitry 340, and switching elements 345 (e.g., FET switches 345). The controller 305 includes combinations of hardware and software that are operable to, among other things, control the operation of the power tool 100, 400, monitor the operation of the power tool 100, 400, activate the one or more indicators 325 and/or light sources 330, etc.

The controller 305 includes a plurality of electrical and electronic components that provide power, operational control, and protection to the components within the controller 305 and/or the power tool 100, 400. For example, the controller 305 includes, among other things, an electronic processor 350 (e.g., a microprocessor, a microcontroller, or another suitable programmable device), a memory 355, input units 360, and output units 365. The electronic processor 350 includes, among other things, a control unit 370, an ALU 375, and a plurality of registers 380 (shown as a group of registers in FIG. 3), and is implemented using a computer architecture (e.g., a modified Harvard architecture, a von Neumann architecture, etc.). The electronic processor 350, the memory 355, the input units 360, and the output units 365, as well as the various modules or circuits connected to the controller 305 are connected by one or more control and/or data buses (e.g., common bus 385). The control and/or data buses are shown generally in FIG. 3 for illustrative purposes. The use of one or more control and/or data buses for the interconnection between and communication among the various modules, circuits, and components would be understood by a person skilled in the art in view of the embodiments described herein.

The memory 355 is a non-transitory computer readable medium and includes, for example, a program storage area 357 and a data storage area 358. The program storage area 357 and the data storage area 358 can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The electronic processor 350 is connected to the memory 355 and executes software instructions that are capable of being stored in a RAM of the memory 355 (e.g., during execution), a ROM of the memory 355 (e.g., on a generally permanent basis), or another non-transitory computer readable medium such as another memory or a disc. Software included in the implementation of the power tool 100, 400 can be stored in the memory 355 of the controller 305. The software includes, for example, firmware, one or more applications, program data, filters, rules, one or more program modules, and other executable instructions. The controller 305 is configured to retrieve from the memory 355 and execute, among other things, instructions related to the control processes and methods described herein. In other constructions, the controller 305 includes additional, fewer, or different components.

The battery pack interface 122 includes a combination of mechanical components (e.g., rails, grooves, latches, etc.) and electrical components (e.g., one or more terminals) configured to and operable for interfacing (e.g., mechanically, electrically, and communicatively connecting) the power tool 100, 400 with a battery pack. For example, power provided by the battery pack to the power tool 100, 400 is provided through the battery pack interface 122 to the power input circuitry 340. The power input circuitry 340 includes combinations of active and passive components to regulate or control the power received from the battery pack prior to power being provided to the controller 305. The battery pack interface 122 may also supply power to the FET switches 345 that are configured to selectively provide power to the motor 200 in accordance with instructions from the controller 305. The battery pack interface 122 also includes, for example, a communication line 390 configured to allow for communication between the controller 305 and the battery pack.

The indicators 325 include, for example, one or more light-emitting diodes ("LEDs"). The indicators 325 can be configured to display conditions of, or information associated with, the power tool 100, 400. For example, the indicators 325 are configured to indicate measured electrical characteristics of the power tool 100, the status of the device, etc. The indicators 325 may additionally or alternatively indicate a light operating mode of the work light 135, a tool mode (e.g., a motor operating mode of the motor 200), or both the light operating mode and the tool mode. The user input(s) 335 is operably coupled to the controller 305 to, for example, select a forward mode of operation or a reverse mode of operation, a torque and/or speed setting for the power tool 100 (e.g., using torque and/or speed switches or a mode pad), a light operating mode of the work light 135, a motor operating mode of the motor 200, etc. In some embodiments, the user input 335 includes a combination of digital and analog input or output devices required to achieve a desired level of operation for the power tool 100, such as one or more knobs, one or more dials, one or more switches, one or more buttons, a mode pad, etc.

In some embodiments, the controller 305 (specifically, the electronic processor 350) is configured to control the motor 200 (e.g., by controlling the FET switches 345) according to a selected motor operating mode in response to determining that the trigger 115 (e.g., a first actuator) has been actuated. In some embodiments, the controller 305 (specifically, the electronic processor 350) is configured to control the work light 135 according to a selected light operating mode. In some embodiments, the controller 305 may receive power from a power supply of the power tool 100, 400 and provide power to the light source(s) 330 directly. In such embodiments, the controller 305 may condition received power as appropriate before providing power to the light source(s) 300. In other embodiments, the light source(s) 330 may be electrically connected to the power supply (e.g., to the battery pack via the battery pack interface 122) with a switch between the light source(s) 330 and the power supply. In such embodiments, the controller 305 may control the switch to allow or disallow power from be provided to the light source(s) 330. In such embodiments, the electrical path from the power supply to the light source(s) 330 may include conditioning circuitry similar to the power input circuitry 340 to regulate or control the power received by the light source(s) 330 from the power supply. In some embodiments, the controller 305 controls the light source(s) 330 to be illuminated in response to determining that the trigger 115 has been actuated.

The controller 305 may be configured to determine monitor tool conditions using the sensors 320. For example, the controller 305 may be configured to determine whether a fault condition of the power tool 100, 400 is present and generate one or more control signals related to the fault condition. In some embodiments, the sensors 320 include one or more current sensors, one or more speed sensors, one or more Hall Effect sensors, one or more temperature sensors, etc. The controller 305 calculates or includes, within memory 355, predetermined operational threshold values and limits for operation of the power tool 100, 400. For example, when a potential thermal failure (e.g., of a FET, the motor 200, etc.) is detected or predicted by the controller 305, power to the motor 200 can be limited or interrupted until the potential for thermal failure is reduced. If the controller 305 detects one or more such fault conditions of the power tool 100, 400 or determines that a fault condition of the power tool 100, 400 no longer exists, the controller 305 is configured to provide information and/or control signals to another component of the power tool 100, 400 (e.g. the battery pack interface 122, the indicators 325, etc.). In some embodiments, the controller 305 is configured to control an output of the light source(s) 330 to indicate information to a user about a tool condition of the power tool 100, 400 (e.g., by flashing the light source(s) 330 a predetermined number of times to indicate different types of fault conditions).

In some instances, the selected motor operating mode according to which the electronic processor 350 controls the motor 200 includes one of a plurality of motor operating modes that indicate at least one of the group consisting of a speed of the motor 200, a torque of the motor 200, a manner of operation of the output device 125, and combinations thereof. Non-limiting examples of the manner of operation of the output device 125 include modes of a rotary hammer (e.g., hammer only, rotate only, hammer and rotate, etc.), specific control of the motor 200 upon a detected event (e.g., impacting of an impact mechanism, a predetermined amount of impacts, a predetermined torque being detected, etc.). In some instances, the motor operating modes may include additional modes and/or control of additional or alternative features of the motor 200 and/or of tool operation in general.

In some instances, the selected light operating mode according to which the electronic processor 350 controls the work light 135 includes one of a plurality of light operating modes that include at least two of an always off light mode, an always on light mode, a first actuator enabled bright light mode, a first actuator enabled dim light mode, and combinations thereof. In some instances, in the always off light mode, the electronic processor 350 may prevent the work light 135 from illuminating even when the trigger 115 is actuated. In some instances, in the always on light mode, the electronic processor 350 may control the work light 135 to be illuminated regardless of whether the trigger 115 is actuated (e.g., a flashlight mode). In some instances, in the first actuator/trigger 115 enabled bright light mode, the electronic processor 350 may control the work light 135 to be illuminated at a first brightness level (e.g., a high brightness level) in response to determining that the first actuator/trigger 115 has been actuated. In this light mode, the electronic processor 350 may also keep the work light 135 illuminated for a predetermined period of time (e.g., five seconds, ten seconds, or the like) after the first actuator/trigger 115 has been released. In some instances, in the first actuator/trigger 115 enabled dim light mode, the electronic processor 350 may control the work light 135 to be illuminated at a second brightness level lower than the first brightness level (e.g., a low brightness level) in response to determining that the first actuator/trigger 115 has been actuated. In this light mode, the electronic processor 350 may also keep the work light 135 illuminated for a predetermined period of time (e.g., five seconds, ten seconds, or the like) after the first actuator/trigger 115 has been released. In some instances, the light operating modes include additional modes such as variations of the always on mode with different levels of brightness, first actuator enabled modes with additional levels of brightness, etc.

As mentioned previously herein, in some instances, the actuator 150, 450 may be a multi-function actuator 150, 450 that allows a user to change different tool parameters/modes (e.g., a motor operating mode, a light operating mode, etc.) depending on a manner in which the actuator 150, 450 is actuated. In some instances, electronic processor 350 is configured to adjust the motor operating mode in response to determining that the actuator 150, 450 (e.g., a second actuator 150, 450) has been actuated in a first manner. The electronic processor 350 may also be configured to adjust the light operating mode in response to determining that the actuator 150, 450 has been actuated in a second manner that is different than the first manner. In some instances, a different manner of actuation of the actuator 150, 450 between the second manner and the first manner includes at least one of the group consisting of a different pressure applied to the actuator 150, 450, a different movement direction of the actuator 150, 450, a different amount of actuations of the actuator 150, 450 within a predetermined time period (e.g., one second, two seconds, or the like), and combinations thereof.

As an example of the different manner of actuation of the actuator 150, 450 being a different pressure applied to the actuator 150, 450, the actuator 150, 450 may include a pressure dependent switch configured to provide a signal to the electronic processor 350 based on an amount of pressure applied to the actuator 150, 450 when the actuator 150, 450 is actuated. In some instances, the actuator 150, 450 and/or the electronic processor 350 may be configured to determine whether the pressure applied to the actuator 150, 450 is greater than a first predetermined pressure threshold and/or a second predetermined pressure threshold greater than the first predetermined threshold. In response to determining that the pressure is less than the first predetermined pressure threshold, the actuator 150, 450 and/or the electronic processor 350 may determine that the actuator 150, 450 has not been actuated. In response to determining that the pressure is greater than the first predetermined pressure threshold but less than the second predetermined pressure threshold, the actuator 150, 450 and/or the electronic processor 350 may determine that the actuator 150, 450 has been actuated with low pressure. In response to the low pressure actuation of the actuator 150, 450, the electronic processor 350 may change one of the motor operating mode and the light operating mode (e.g., by cycling to the next mode of a plurality modes). In response to determining that the pressure is greater than the second predetermined pressure threshold, the actuator 150, 450 and/or the electronic processor 350 may determine that the actuator 150, 450 has been actuated with high pressure. In response to the high pressure actuation of the actuator 150, 450, the electronic processor 350 may change the other one of the motor operating mode and the light operating mode (e.g., by cycling to the next mode of a plurality modes).

In some instances, each low pressure actuation of the actuator 150, 450 may cause the electronic processor 350 to cycle to the next one of the motor or light operating mode while each high pressure actuation of the actuator 150, 450 may cause the electronic processor 350 to cycle to the next one of the other of the motor or light operating mode. In some instances, pressing and holding the actuator 150, 450 for a predetermined period of time (e.g., one second, two second, or the like) may cause the electronic processor 350 to cycle through certain operating modes of the power tool 100, 400 depending on the pressure at which the actuator 150, 450 is pressed and held. For example, the electronic processor 350 may cycle to the next motor operating mode every one second as long as the actuator 150, 450 is held with low pressure. Continuing this example, the electronic processor 350 may cycle to the next light operating mode every one second as long as the actuator 150, 450 is held with high pressure. In some instances, a selected motor operating mode and/or a selected light operating mode of the power tool 100, 400 is indicated by the indicators 325. Accordingly, the indicators 325 may allow a user to determine which operating modes the power tool 100, 400 is currently operating or which operating modes are being cycled through using the actuator 150, 450.

As an example of the different manner of actuation of the actuator 150, 450 being a different movement direction of the actuator 150, 450, the actuator 150, 450 may be configured to be actuated in a plurality of directions. For example, the actuator 150, 450 may be, a dual movement sliding actuator, a joystick-type actuator, or the like. In some instances, the first manner of actuating the actuator 150, 450 may include moving the actuator 150, 450 in a first direction (e.g., forward, backward, left, right, etc.). In some instances, the second manner of actuating the actuator 150, 450 may include moving the actuator 150, 450 in a second direction different than the first direction (e.g., backward, forward, right left, etc.). In some instances, each movement of actuator 150, 450 in the first manner may cause the electronic processor 350 to cycle to the next one of the motor or light operating mode while each movement of the actuator 150, 450 in the second manner may cause the electronic processor 350 to cycle to the next one of the other of the motor or light operating mode. Similar to the example including the pressure dependent switch above, the variable movement direction switch may be held in a first position corresponding to the first manner of movement or in a second position corresponding to the second manner of movement to cause the electronic processor 350 to cycle through respective operating modes of the power tool 100, 400 (e.g., cycle through respective operating modes every one second while the actuator 150, 450 is held in the respective position). In some instances, the variable movement direction switch may be configured to return to a starting unactuated position when it is released by the user. For example, the variable movement direction switch may include a spring or other biasing element to cause the variable movement direction switch to return to the starting unactuated position when it is released by the user.

As an example of the different manner of actuation of the actuator 150, 450 being a different amount of actuations of the actuator 150, 450 within a predetermined time period, the electronic processor 350 may be configured to determine that the actuator 150, 450 has been actuated/pressed and released once in a predetermined time period (e.g., one second, two second, or the like) or twice in the predetermined time period. Each time that the actuator 150, 450 is actuated and released once in the predetermined period (e.g., a single press), the electronic processor 350 may cycle to the next one of the motor or light operating mode. Each time that the actuator 150, 450 is actuated and released twice in the predetermined period (e.g., a double press), the electronic processor 350 may cycle to the next one of the other of the motor or light operating mode. In some instances, the electronic processor 350 starts timing for monitoring of the predetermined time period in response to a first actuation of the actuator 150, 450. Once the predetermined time period expires, the electronic processor 350 may start timing for monitoring of another instance of the predetermined time period in response to the actuator 150, 450 being actuated again.

In some instances, two or more of the previous examples of the types of actuator 150, 450 may be combined. For example, the actuator 150, 450 may be a pressure dependent switch that is also a variable movement direction switch.

In some instances, the actuator 150, 450 may be a push button for which the electronic processor 350 may determine only whether the push button is actuated or not actuated. In such instances, the electronic processor 350 may cycle through different combinations of motor operating modes and light operating modes each time the push button is actuated or every one second (or other predetermined time period) while the push button remains actuated. For example, rather than determining whether to cycle through just motor operating modes or just light operating modes depending on a manner in which the actuator 150, 450 is actuated as described in the previous examples, the electronic processor 350 may cycle through combined operating modes that indicate both the motor operating mode and the light operating mode (e.g., cycling through modes 1-8 in Table 1 below). Accordingly, one or both of the motor operating mode and the light operating mode of the power tool 100, 400 may change as the electronic processor 350 cycles through each of the modes 1-8 in Table 1 below. In some instances, the motor operating mode and/or the light operating mode of the power tool 100, 400 is indicated by the indicators 325 as the modes are cycled through.

TABLE 1

| Mode Number | Motor Operating Mode | Light Operating Mode |
|---|---|---|
| 1 | Speed 1 | Always off |
| 2 | Speed 1 | Always on |
| 3 | Speed 1 | First actuator enabled bright |
| 4 | Speed 1 | First actuator enabled dim |
| 5 | Speed 2 | Always off |
| 6 | Speed 2 | Always on |
| 7 | Speed 2 | First actuator enabled bright |
| 8 | Speed 2 | First actuator enabled dim |

As indicated in the above examples, a single user input device (e.g., actuator 150, 450) may be used to optionally control both a tool mode (e.g., motor operating mode) of the power tool 100, 400 and a light operating mode of the work light 135 of the power tool 100, 400. The single user input device may additionally or alternatively be used to control other different operating modes/parameters of the power tool 100, 400. Using a single user input device to optionally control multiple different operating modes and devices/elements of the power tool 100, 400 uses less space on the power tool 100, 400 than including multiple separate actuators with dedicated functionality and allows the power tool 100, 400 (e.g., a handheld power tool) to be light weight, compact, and easily maneuverable.

However, in some instances, the power tool 100, 400 may nevertheless include separate actuators with dedicated functionality, for example, to cycle through respective operating modes of the work light 135 and the motor 200 (e.g., light operating mode actuator 505 and a motor operating mode actuator 510 as shown in FIGS. 5A-5B). FIGS. 5A-5B show schematic diagrams of different wiring options when the power tool 100, 400 includes both the light operating mode actuator 505 (e.g., a third actuator) and the motor operating mode actuator 510 (e.g., a second actuator). As explained previously herein and as shown in FIGS. 5A-5B, a user interface control circuit 515 (which may be located on its own user interface PCB 515) may be coupled to the trigger 115, 415 (not shown in FIGS. 5A-5B) and/or to one more actuators 505, 510 of the power tool 100, 400. The user interface control circuit/PCB 515 may be coupled to the PCB 212 (e.g., a control PCB 212 on which the electronic processor 350 is mounted).

In the example schematic diagram shown in FIG. 5A, the motor operating mode actuator 510 is coupled to the user interface control circuit/PCB 515, which is, in turn, coupled to the control PCB 212. For example, the user interface control circuit/PCB 515 may provide a binary on/off signal to an input pin of the electronic processor 350 on the control PCB 212 to indicate whether the motor operating mode actuator 510 has been actuated. On the other hand, the light operating mode actuator 505 is coupled directly to another input pin of the electronic processor 350 on the control PCB 212. According to such a design, if the light operating mode actuator 505 is desired to be added to a power tool 100, 400 that does not already have a light operating mode actuator 505, the control PCB 212 would be re-designed and wires would be added within the housing 105, 405 of the power tool 100, 400 to couple the light operating mode actuator 505 to the control PCB 212. Additionally, firmware on the electronic processor 350 would be updated to account for this additional input.

Conversely, FIG. 5B shows a schematic diagram that reduces the amount of physical redesign when the light operating mode actuator 505 is added to a power tool 100, 400 that does not already have a light operating mode actuator 505. As shown in FIG. 5B, the light operating mode actuator 505 is coupled to the user interface control circuit/PCB 515 that may already have vacant input pins and that is often located closer to the light operating mode actuator 505 and/or the motor operating mode actuator 510 compared to the location of the control PCB 212 with respect to the light operating mode actuator 505 and/or the motor operating mode actuator 510. Accordingly, wires used to connect the light operating mode actuator 505 to the user interface control circuit/PCB 515 may often be shorter than the wires that would couple the light operating mode actuator 505 to the control PCB 212. Reduced wire length may be beneficial in a handheld power tools with limited space to route wires within the housing 105, 405.

Firmware of the user interface control circuit/PCB 515 and of the electronic processor 350 may be updated such that the electronic processor 350 and the control PCB 212 do not need to be rewired to determine whether the motor operating mode actuator 510 or the light operating mode actuator 505 was actuated. For example, firmware of the user interface control circuit/PCB 515 may be updated such that the user interface control circuit/PCB 515 is configured to provide a varied signal to a single input pin of the electronic processor 350 on the control PCB 212 depending on whether the motor operating mode actuator 510 or the light operating mode actuator 505 was actuated. In some instances, instead of the user interface control circuit/PCB 515 providing a binary on/off signal to the input pin of the electronic processor 350, the user interface control circuit/PCB 515 does not provide any signal when neither actuator 505 or 510 is actuated, provides a 1.3 Volt signal when one of the actuators 505 or 510 is actuated and provides a 2.3 Volt signal when the other one of the actuator 505 or 510 is actuated. The firmware of the electronic processor 350 may be updated accordingly to allow the electronic processor 350 to determine which actuator 505 or 510 has been actuated (if any) based on the signal received from the user interface control circuit/PCB 515 on the single input pin of the electronic processor 350. The electronic processor 350 may then cycle through a respective operating mode depending on which actuator 505, 510 was actuated as explained previously herein.

In other words, the electronic processor 350 may be configured to receive a signal from the user interface control circuit/PCB 515, and determine whether the signal indicates that the motor operating mode actuator 510 (e.g., a second actuator 510) has been actuated or that the light operating mode actuator 505 (e.g., a third actuator 505) has been actuated. The electronic processor 350 may also be configured to adjust the motor operating mode of the power tool 100, 400 in response to determining that the signal indicates that the second actuator 510 has been actuated. The electronic processor 350 may also be configured to adjust the light operating mode in response to determining that the signal indicates that the third actuator 505 has been actuated. The electronic processor 350 may also be configured to control the motor 200 according to the motor operating mode in response to determining that the trigger 115, 415 (e.g., a first actuator) has been actuated, and control the work light 135 according to the light operating mode.

As indicated by the above example, the signal from the user interface control circuit/PCB 515 may be received by the electronic processor 350 via a single input pin of the electronic processor 350 (e.g., received via a single wire of the plurality of wires shown between the user interface control circuit/PCB 515 and the control PCB 212 of FIG. 5B). The electronic processor 350 may be configured to determine whether the signal indicates that the second actuator 510 has been actuated or that the third actuator 505 has been actuated by analyzing a voltage level of the signal. For example, the electronic processor 350 may be configured to determine that the second actuator 505 has been actuated in response to the voltage level being within a first voltage range (e.g., approximately 1.3 Volts, greater than 1 Volt but less than 1.5 Volts, or the like). The electronic processor 350 may also be configured to determine that the third actuator 505 has been actuated in response to the voltage level being within a second voltage range different than the first voltage range (e.g., approximately 2.3 Volts, greater than 2 Volts, or the like).

Thus, embodiments described herein provide a power tool including a lighting system that can be controlled to operate in different modes using a dedicated actuator or using a multi-functional actuator that may also control tool operating modes such as motor operating modes of a motor of the power tool. Various features and advantages are set forth in the following claims.

What is claimed is:

1. A power tool comprising:

a housing;

a motor situated within the housing;

an output device coupled to the motor and configured to perform a task;

a first actuator situated on the housing and configured to be actuated by a user to enable operation of the motor to drive the output device to perform the task;

a work light situated within the housing and configured to illuminate a work area where the task is being performed;

a second actuator situated on the housing and configured to be actuated by the user to adjust a motor operating mode of the motor and a light operating mode of the work light; and an electronic processor situated within the housing and coupled to the first actuator and the second actuator, wherein the electronic processor is configured to:

control the motor according to the motor operating mode in response to determining that the first actuator has been actuated, control the work light according to the light operating mode, adjust the motor operating mode in response to determining that the second actuator has been actuated in a first manner, and adjust the light operating mode in response to determining that the second actuator has been actuated in a second manner that is different than the first manner;

wherein a different manner of actuation of the second actuator between the second manner and the first manner includes at least one of the group consisting of (i) a low pressure actuation of the second actuator and a high pressure actuation of the second actuator, (ii) a different actuation direction of movement of the second actuator, (iii) a first amount of actuations of the second actuator within a predetermined time period to cause each change of the motor operating mode and a second amount of actuations of the second actuator within the predetermined time period to cause each change of the light operating mode, wherein the second amount is different than the first amount, and (iv) combinations thereof.

2. The power tool of claim 1, wherein the motor operating mode is one of a plurality of motor operating modes that indicate at least one of the group consisting of a speed of the motor, a torque of the motor, a manner of operation of the output device, and combinations thereof.

3. The power tool of claim 2, wherein the manner of operation of the output device includes at least one of the group consisting of a hammer only operation, a hammer and rotate operation, a rotate only operation, a specific operation upon detection of a certain operational event, and combinations thereof.

4. The power tool of claim 1, wherein the light operating mode is one of a plurality of light operating modes that include at least two of an always off light mode, an always on light mode, a first actuator enabled bright light mode, a first actuator enabled dim light mode, and combinations thereof.

5. The power tool of claim 1, wherein the second actuator includes a pressure dependent switch configured to provide a signal to the electronic processor based on an amount of pressure applied to the second actuator when the second actuator is actuated.

6. The power tool of claim 1, wherein the second actuator is configured to be actuated in a plurality of directions;

wherein the first manner of actuating the second actuator includes moving the second actuator in a first direction; and wherein the second manner of actuating the second actuator includes moving the second actuator in a second direction different than the first direction.

7. The power tool of claim 1, wherein the housing includes a motor housing, a connection portion, and a handle extending between and coupling the motor housing and the connection portion;

wherein the second actuator is located on one of a top surface of the motor housing, a top surface of the connection portion, a rear side of the motor housing, a rear side of the connection portion, and a lower side of the motor housing between the motor housing and the handle.

8. The power tool of claim 1, wherein the power tool includes one of an impact wrench, a sander, a power drill, a hammer drill, a rotary hammer, an impact driver, and a nailer.

9. A power tool comprising:

a housing;

a motor situated within the housing;

an output device coupled to the motor and configured to perform a task;

a first actuator situated on the housing and configured to be actuated by a user to enable operation of the motor to drive the output device to perform the task;

a second actuator situated on the housing and configured to be actuated by the user to adjust a motor operating mode of the motor;

a work light situated within the housing and configured to illuminate a work area where the task is being performed;

a third actuator situated on the housing and configured to be actuated by the user to adjust a light operating mode of the work light;

a user interface control circuit situated within the housing and coupled to the second actuator and the third actuator; and an electronic processor situated within the housing and coupled to the user interface control circuit, wherein the electronic processor is configured to:

receive a signal from the user interface control circuit, determine whether the signal indicates that the second actuator has been actuated or that the third actuator has been actuated, in response to determining that the signal indicates that the second actuator has been actuated, adjust the motor operating mode, in response to determining that the signal indicates that the third actuator has been actuated, adjust the light operating mode, control the motor according to the motor operating mode in response to determining that the first actuator has been actuated, and control the work light according to the light operating mode, wherein the signal is received by the electronic processor via a single input pin of the electronic processor, and wherein the electronic processor is configured to determine whether the signal indicates that the second actuator has been actuated or that the third actuator has been actuated by analyzing a voltage level of the signal.

10. The power tool of claim 9, wherein the user interface control circuit is configured to:

receive separate input signals from each of the second actuator and the third actuator; and provide the signal to the single input pin of the electronic processor.

11. The power tool of claim 9, wherein the electronic processor is configured to:

determine that the second actuator has been actuated in response to the voltage level being within a first voltage range; and determine that the third actuator has been actuated in response to the voltage level being within a second voltage range different than the first voltage range.

12. The power tool of claim 9, wherein the user interface control circuit is located on a first circuit board, and wherein the electronic processor is located on a second circuit board;

wherein the first circuit board is located closer to the third actuator than the second circuit board is located to the third actuator.

* * * * *